US010719388B2

(12) United States Patent
Reynolds (10) Patent No.: US 10,719,388 B2
(45) Date of Patent: *Jul. 21, 2020

(54) DECOUPLED MAINTENANCE AND REPOSITORY SYNCHRONIZATION ERROR DETECTION

(71) Applicant: GitHub, Inc., San Francisco, CA (US)

(72) Inventor: Patrick Reynolds, Pensacola, FL (US)

(73) Assignee: GITHUB, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,491

(22) Filed: Sep. 17, 2018

(65) Prior Publication Data

US 2019/0057001 A1 Feb. 21, 2019

Related U.S. Application Data

(63) Continuation of application No. 14/998,365, filed on Dec. 23, 2015, now Pat. No. 10,102,084.

(51) Int. Cl.
| | |
|---|---|
| *G06F 11/00* | (2006.01) |
| *G06F 11/10* | (2006.01) |
| *G06F 11/16* | (2006.01) |
| *G06F 11/30* | (2006.01) |

(52) U.S. Cl.
CPC ...... *G06F 11/1004* (2013.01); *G06F 11/1641* (2013.01); *G06F 11/1662* (2013.01); *G06F 11/302* (2013.01); *G06F 11/3055* (2013.01); *G06F 2201/80* (2013.01)

(58) Field of Classification Search
CPC ............ G06F 11/1004; G06F 11/1641; G06F 11/1662; G06F 11/302; G06F 11/3055; G06F 11/08; G06F 11/102; G06F 11/1024; G06F 11/1072; G06F 11/1076; G06F 11/1451; G06F 11/1469; G06F 2201/80; G06F 2201/805; G06F 2201/84; G06F 2201/86; G06F 2201/87
See application file for complete search history.

(56) References Cited

U.S. PATENT DOCUMENTS

| | | | | |
|---|---|---|---|---|
| 5,878,050 A | * | 3/1999 | Brahme | G06F 11/10 714/719 |
| 6,304,882 B1 | * | 10/2001 | Strellis | G06F 11/2064 |
| 2004/0093555 A1 | * | 5/2004 | Therrien | G06F 11/1448 714/805 |

* cited by examiner

*Primary Examiner* — Anthony J Amoroso
(74) *Attorney, Agent, or Firm* — Workman Nydegger (57) ABSTRACT

A system for maintaining a repository replication system includes an interface and a processor. The interface is to receive a request to modify a repository, wherein the repository comprises repository copies. The processor is to determine whether modifying the repository resulted in an indication of an error, wherein the indication of the error is based at least in part on a plurality of checksums, wherein a checksum of the plurality of checksums is associated with a repository copy of the repository copies; and in the event that modifying the repository resulted in the indication of the error: queue a repair request to repair the error; and execute a repair process to repair the error associated with the repair request, wherein executing the repair process occurs asynchronously to queuing the error request.

16 Claims, 8 Drawing Sheets

DECOUPLED MAINTENANCE AND REPOSITORY SYNCHRONIZATION ERROR DETECTION

CROSS REFERENCE TO OTHER APPLICATIONS

This application is a continuation of co-pending U.S. patent application Ser. No. 14/998,365 entitled DECOUPLED MAINTENANCE AND REPOSITORY SYNCHRONIZATION ERROR DETECTION filed Dec. 23, 2015 which is incorporated herein by reference for all purposes.

BACKGROUND OF THE INVENTION

A distributed version control system keeps multiple copies of each repository by maintaining a set of replicas for each repository. Each replica contains an exact copy of the repository. However, in some cases an error occurs that leads to one replica not matching the others. In this case, a repair sequence is typically initiated upon detection of the error to minimize the time that the replica is out of sync. The repairs for the problem are usually complex and, to make matters worse, the underlying failure that caused the error may still be occurring. If so, it may be impossible to correct the error right away, or additional errors may occur or reoccur during the repair.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for maintaining a repository replication system is disclosed. The system comprises an interface and a processor. The interface is to receive a request to modify a repository, wherein the repository comprises repository copies. The processor is to determine whether modifying the repository resulted in an indication of an error. The indication of the error is based at least in part on a plurality of checksums. A checksum of the plurality of checksums is associated with a repository copy of the repository copies. In some embodiments, a checksum comprises a text, binary, or numeric value summarizing the state and contents of a repository copy, such that two repository copies that are out of sync are associated with unequal checksum values. The processor is further to queue a repair request to repair the error and execute a repair process to repair the error associated with the repair request in the event that modifying the repository resulted in the indication of the error. Executing the repair process occurs asynchronously to queuing the error request.

In some embodiments, a system for repairing repository replication includes a separate maintenance server. The separate maintenance server periodically goes through, finds errors, and repairs them. One of the tradeoffs of having a separate maintenance server is that it takes longer to repair a broken node (also known as a replica, repository copy, or copy) increasing the time that a node is out of sync. However, a distributed version control system does not need all the nodes to be working all the time. For example, in some embodiments, only a majority of a system's nodes are needed to successfully perform a write transaction, and only one healthy node to satisfy a read transaction. In the event that one of the nodes has a failure then the other nodes (or copies) are used while the failed node is fixed. As long as a majority of the nodes are healthy the repository can continue to operate without the end user knowing there is a problem. Moving the maintenance code—the error detection code, the repair code, or both—out of transaction code achieves a more efficient system: (i) it makes the maintenance logic and the transaction logic simpler, (ii) it provides a natural period of time for the failure mode to pass before attempting to fix the server (e.g., compared to fixing the error immediately or using in-process timers); and (iii) it makes writing the maintenance code and the transaction code easier.

In some embodiments, the separate maintenance server contains an error detection manager which queries the state of a repository and determines whether a repair is necessary.

The error detection manager may queue a repair job on a repair job queue in the event that a repair is necessary. In the event that no repair job is necessary, then no repair job is queued. The repair job on the repair job queue is executed asynchronously by a separate repair manager. In some embodiments, the error detection manager determines that a repair is necessary by performing a set of queries on the state of a repository. In some embodiments, the set of queries comprises one or more of the following: Do all the repository copy checksums match? In the event that there are N repository copies, then are there exactly N checksums? Are the repository copies sufficiently distributed? Are any of the servers containing repositories too full? or any other appropriate query. The error detection manager analyzes the state returned by the set of queries, and if necessary, generates a set of repair jobs which will bring the repository to a desired state. The set of repair jobs is queued on a repair job queue. A repair job comprises one or more of the following: pre-compiled computer code, a shell script, a Ruby script, a Python script, Java code, or any other appropriate set of commands.

In some embodiments, the separate maintenance server includes a repair job queue. The repair job queue manages a queue of repair jobs. The repair job queue acts as a data buffer between two asynchronous tasks: the error detection manager and the repair manager. Repair jobs are put on the repair job queue by the error detection manager, and repair jobs are taken off the repair job queue by a repair manager. The error detection manager runs periodically (e.g., based on a timer) and fills the repair job queue as the error detection manager finds errors. Each time the error detection manager queues a repair job, the error detection manager does not wait for the repair job to be run by the repair manager. The repair manager may be triggered each time a repair job is enqueued, or it may also run periodically (e.g., based on a timer). Each time the repair manager is activated, it looks to see whether any repair jobs are on the repair job queue and executes one or more of the repair jobs in the event that there are repair jobs on the repair job queue.

In some embodiments, the separate maintenance server contains a repair manager which pulls repair jobs off the repair job queue and executes the repair jobs. When a repair job completes, the repair manager queries the state of the repository and generates a checksum. In the event that the checksum is in a desired state, the repair job is considered complete. In the event that the checksum is not in a desired state, the repair job is re-queued on the repair job queue for execution at a later time.

In some embodiments, there are three types of repairs performed after checksums disagree: the first is to repair just a single repository, which is cheap; the second is to repair a whole related set of repositories, which is more expensive; and the third is to delete the failed replica and create a new one on a different server, which is quite expensive. In some embodiments, all three are cheaper than notifying an administrator; this is avoided.

Figure 1:
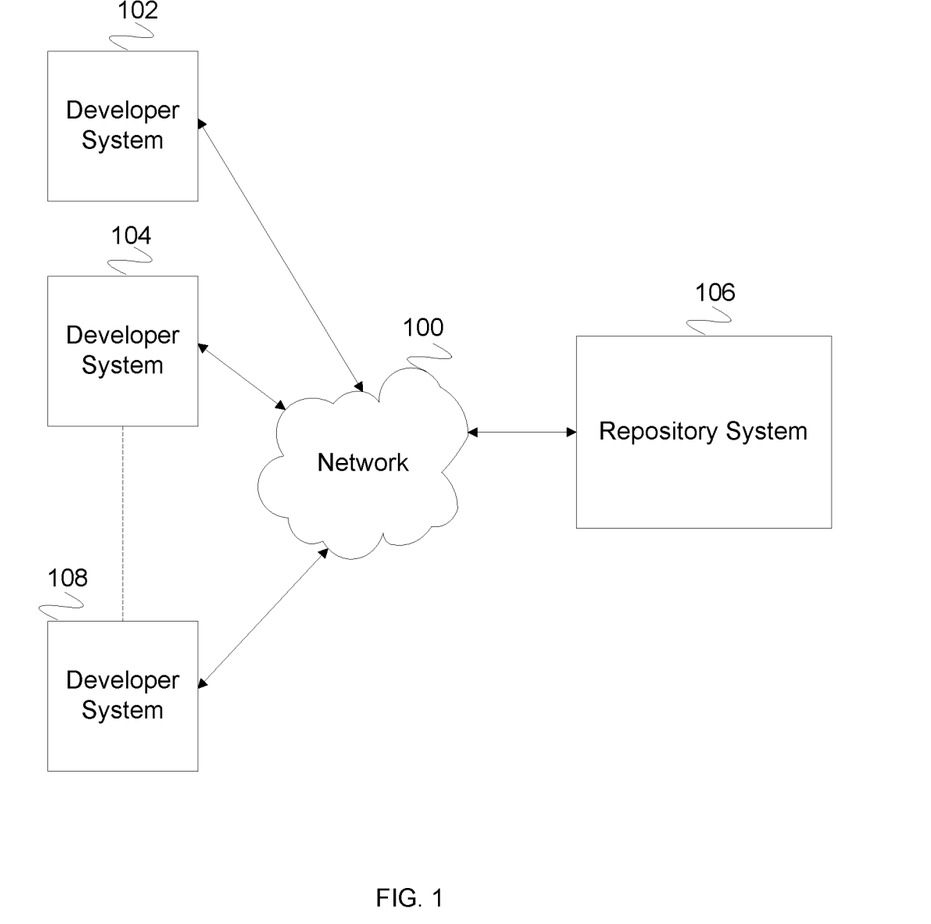
FIG. 1 is a block diagram illustrating the embodiment of a system for a repository system.

FIG. 1 is a block diagram illustrating the embodiment of a system for a repository system. In some embodiments, the network system of FIG. 1 provides communication between any appropriate number of software developers and a repository system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, developer system 102, developer system 104, and developer system 108 comprise systems for use by a software developer while developing software. A user using a developer system (e.g., developer system 102, developer system 108, and developer system 104) communicates with repository system 106 to store copies of code. For example, a user requests to push a copy of code to repository system 106. Repository system 106 stores the pushed code on each of its nodes. In various embodiments, developer system 102, developer system 108, and developer system 104 comprise systems for use by any appropriate content developer (e.g., a writer, a video editor, a computer-aided-designer, etc.). In various embodiments there are 1, 6, 22, 122, 1059, or any other appropriate number of developer systems in communication with network 100. Repository system 106 comprises a system for maintaining a repository. In various embodiments, repository system 106 maintains copies of developer repositories, handling requests to modify the copies developer repositories, maintaining checksums of the copies of developer repositories, checking the health status of the copies of developer repositories, fixing unhealthy portions of the copies of developer repositories, or any other appropriate repository system function.

Figure 2:
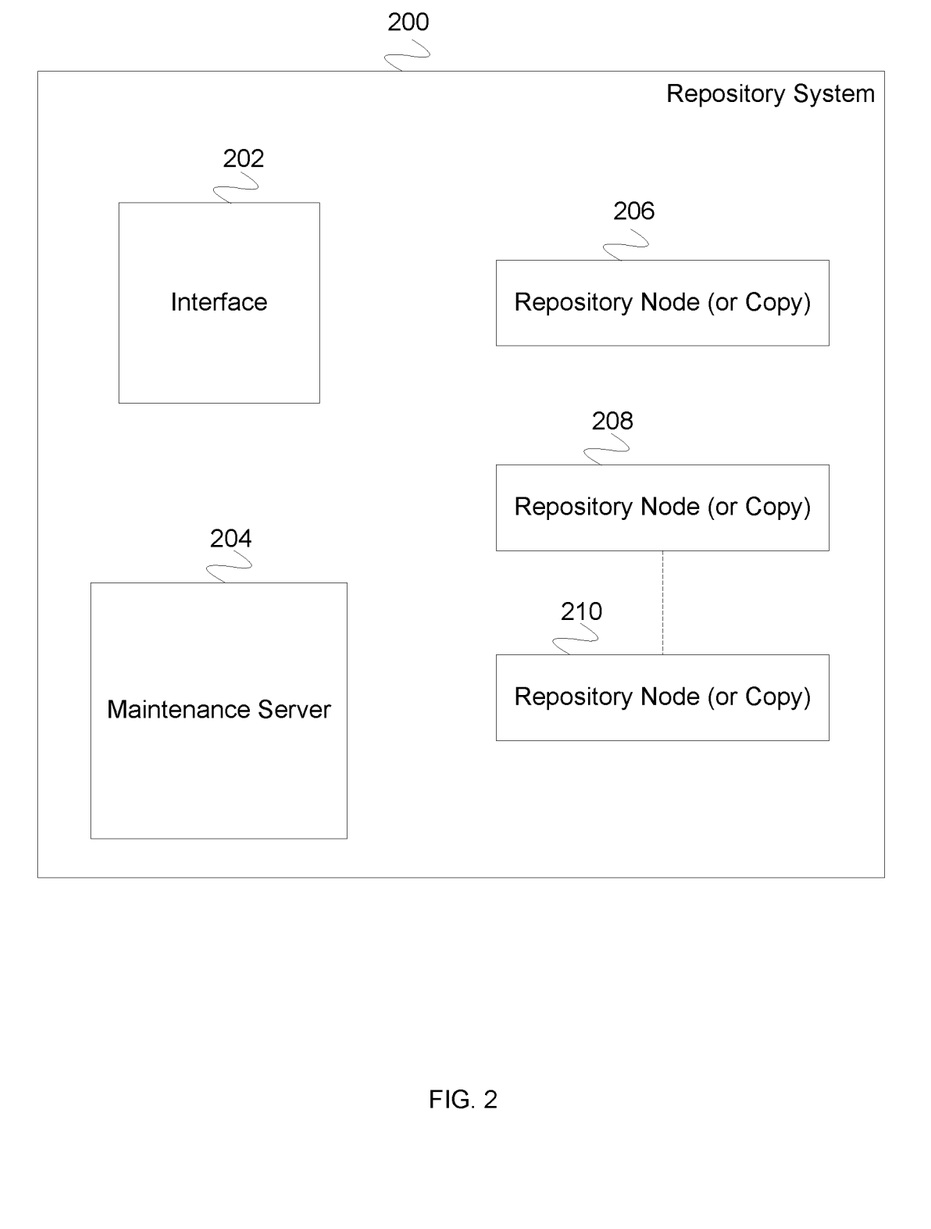
FIG. 2 is a block diagram illustrating the embodiment of a system for a repository system.

FIG. 2 is a block diagram illustrating the embodiment of a system for a repository system. In some embodiments, repository system 200 comprises repository system 106 of FIG. 1. In the example shown, the repository system comprises interface system 202 for handling requests to repository system 200. In some embodiments, interface system 202 provides a way to manipulate the repository system, get the state of the repository system, receive checksums from a checksum database, and receive checksums from the repository copies. In some embodiments, interface system 202 applies repository write operations, implements repository read operations, and updates a checksum database. Repository system 200 additionally comprises maintenance server 204. In various embodiments, maintenance server 204 maintains a repair job queue, pulls jobs off the repair job queue, executes repair jobs, reports repair job execution status, and performs any other appropriate maintenance functions. In some embodiments, maintenance server 204 executes jobs asynchronously from interface system 202, allowing the maintenance of repository system 200 to happen while the interface system continues its functions. In some embodiments, maintenance server 204 implements a checksum database, an error detection manager, a repair manager, a queue manager, and manages queue memory. Repository system 200 additionally comprises repository nodes or copies. A group of N nodes represent a single repository. In the example shown, repository system 200 represents a repository with three nodes: node 206, node 208, and node 210. Nodes 206, 208, and 210 are copies of each other.

Figure 3:
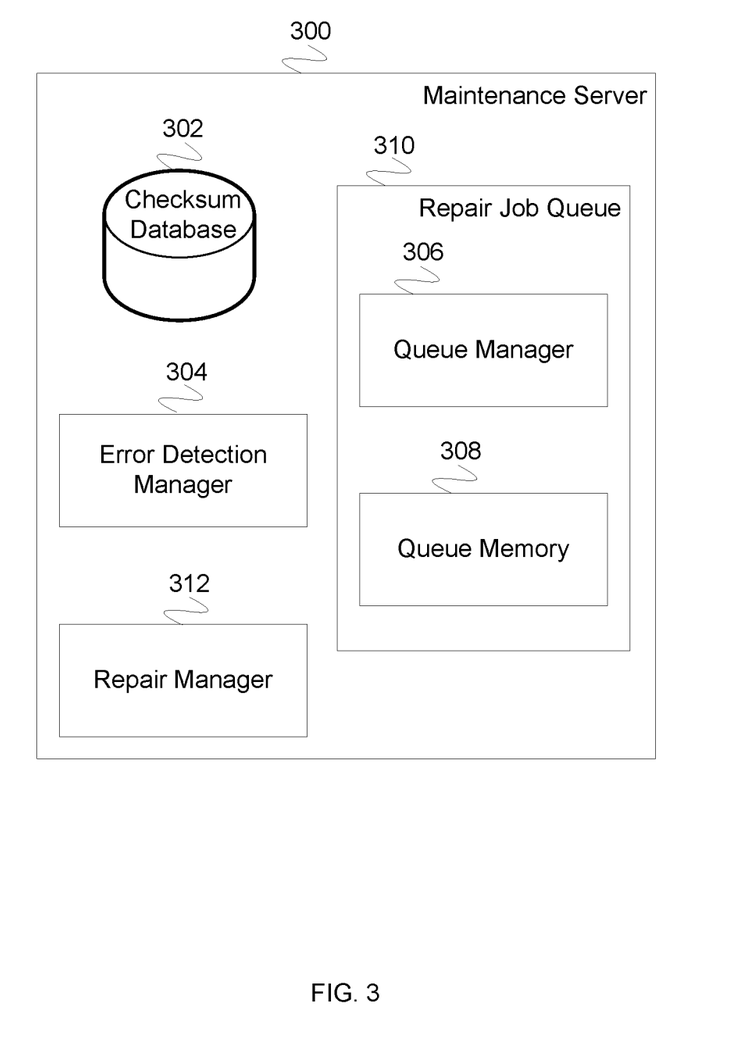
FIG. 3 is a block diagram illustrating the embodiment of a system for implementing maintenance server system.

FIG. 3 is a block diagram illustrating the embodiment of a system for implementing maintenance server system. In some embodiments, maintenance server 300 is used to implement maintenance server 204 of FIG. 2. In the example shown, maintenance server 300 comprises checksum database 302, error detection manager 304, repair manager 312, and repair job queue 310. Repair job queue 310 comprises queue manager 306 and queue memory 308. Maintenance server system 300 comprises checksum database 302 for maintaining a database of checksums. The checksums represent the state of each node in a repository. In some embodiments, checksum database 302 is queried for a snapshot of repository checksums and the checksums are compared to check for a repository error state. In some embodiments, checksum database 302 is updated when a write operation completes. Maintenance server 300 additionally comprises error detection manager 304. In some embodiments, error detection manager 304 runs periodically (e.g., based on a timer) and executes appropriate queries to query the state of a repository. In the event that a query results in an error state, error detection manager 304 puts an appropriate repair job on repair job queue 310. In some embodiments, an appropriate repair job directly correlates to the error found (e.g., in the event that all but one repository node checksum have the same value, a copy repair job is queued to copy the contents an in agreement node to the one node in disagreement). Maintenance server 300 comprises repair manager 312. In some embodiments, repair manager 312 is notified whenever there is a repair job on repair job queue 310. When there is a repair job on repair job queue 310, repair manager 312 pulls the repair job off repair job queue 310 and executes the commands in the repair job. In the event that repair job queue 310 is empty, repair manager 312 waits until the next time there is a job in the repair job queue 310. In the event that commands are executed and any of the commands exit with an error, the repair job is re-queued on repair job queue 310 for execution at a later time, and repair manager 312 executes the next job in the queue, if any. In the event that commands are executed and all complete without error, repair manager 312 queries the state of the repository and generates a checksum for each repository node, which are stored in checksum database 302. Whether or not the checksums have the same value, the repair job is considered complete and repair manager 312 executes or waits for the next job. In the event that the checksums do not have the same value, the error detection manager 304 will queue another repair job on repair job queue 310 the next time it checks the repository. Maintenance server 300 comprises repair job queue 310. Repair job queue 310 comprises queue manager 306 and queue memory 308. In some embodiments, queue manager 306 inserts repair jobs into queue memory 308 and queue manager 306 removes jobs from queue memory 308. Queue manager 306 determines the order in which repair jobs are stored into queue memory 308. In various embodiments, queue manager 308 implements a queue scheme comprising one or more of the following: a last-in-first-out (LIFO) queue, a first-in-first-out (FIFO) queue, a priority ordered queue, a weighted queue, or any other appropriate queue scheme.

Figure 4:
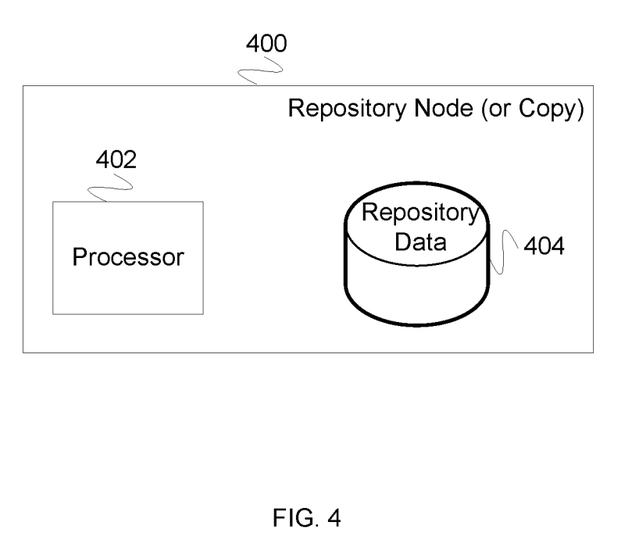
FIG. 4 is a block diagram illustrating the embodiment of a system for implementing a repository node (or copy).

FIG. 4 is a block diagram illustrating the embodiment of a system for implementing a repository node (or copy). In some embodiments, repository node 400 is used to implement repository 206, repository 208, or repository 210. In the example shown, repository node 400 comprises processor 402 which controls the data that comes into and out of repository 400. In some embodiments, processor 402 generates checksums, implements data copies from one repository node to another, handles incoming read requests, handles incoming write requests, or any other appropriate processor function. In the example shown, repository node 400 comprises repository data 404 which represents the repository node data store.

Figure 5:
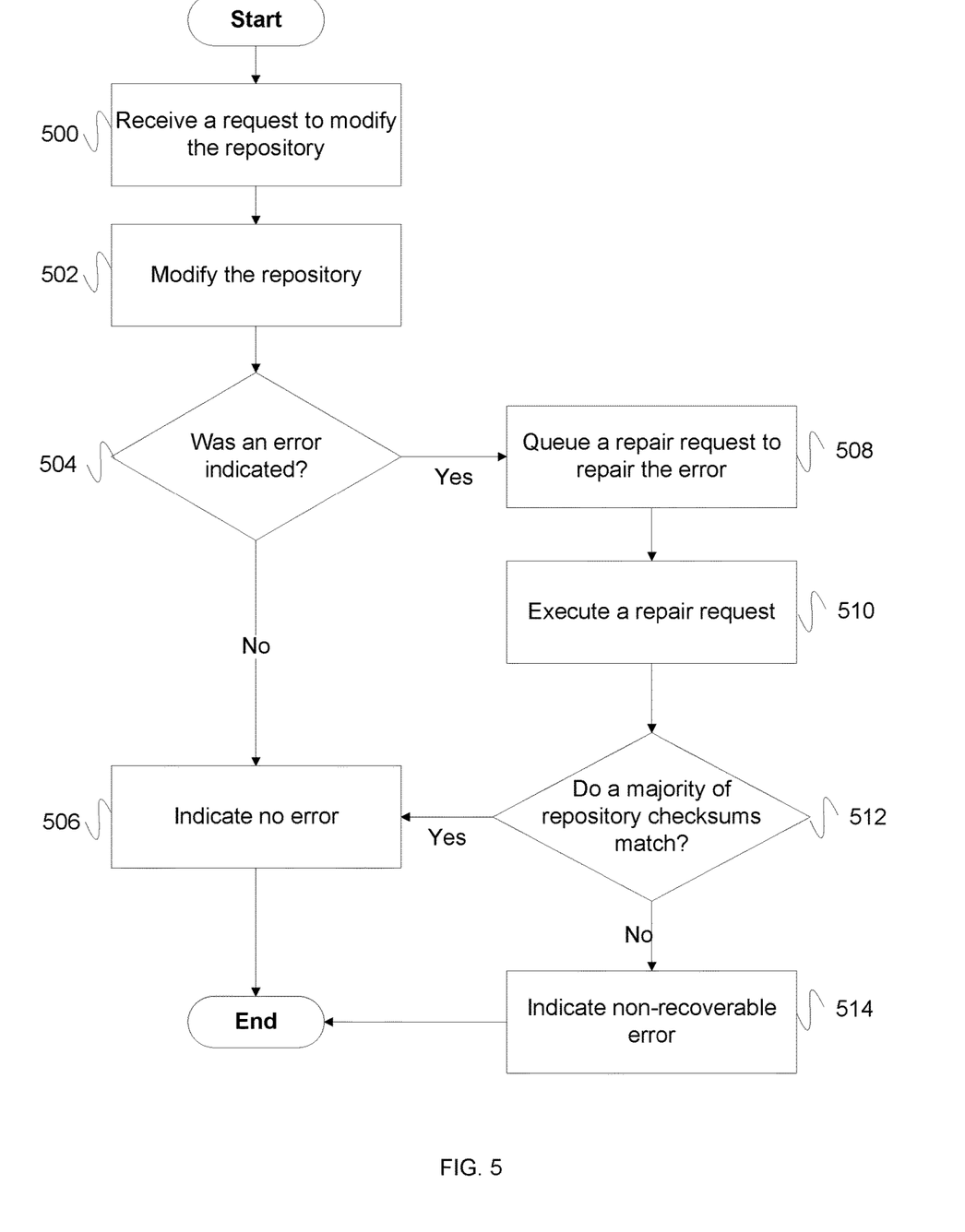
FIG. 5 is a flow diagram illustrating an embodiment of a process for implementing an asynchronous error correcting repository system.

FIG. 5 is a flow diagram illustrating an embodiment of a process for implementing an asynchronous error correcting repository system. In some embodiments, the process of FIG. 5 is implemented by repository system 200 of FIG. 2. In 500, a request is received to modify the repository. In various embodiments, the request comprises one or more of the following: a write request, a move request, a delete request, a rename request, an append request, or any other modification request. In 502, the repository is modified. In various embodiments, the repository is modified by one or more of the following: a write request, a move request, a delete request, a rename request, an append request, or any other modification request. In 504, it is determined whether an error is indicated. In the event that an error is indicated, control passes to 508. In the event that error is not indicated, control passes to 506. In 508, a repair request to repair the error is queued. In some embodiments, the repair request is queued to the repair job queue and the modification task ends. In 510, a repair request is executed. In some embodiments, the repair request is removed from the repair job queue and implemented asynchronously by a repair manager. Upon completion of the repair request, control passes to 512. In 512, it is determined whether a majority of repository checksums match. In some embodiments, the repair manager generates a checksum for each repository node in the repository system. In the event that the checksums are the same, control passes to 506. In the event that the checksums are not the same, control passes to 514. In 514, a non-recoverable error is indicated. In some embodiments, the indication that the job has failed is used to flag an administrator to review the job. In some embodiments, the indication that the job has failed causes the repair manager to queue an alternative repair job, which may have a higher probability of success than the originally queued repair job, but may also consume more resources or disrupt access to the repository. In 506, no error is indicated, and the process ends.

Figure 6:
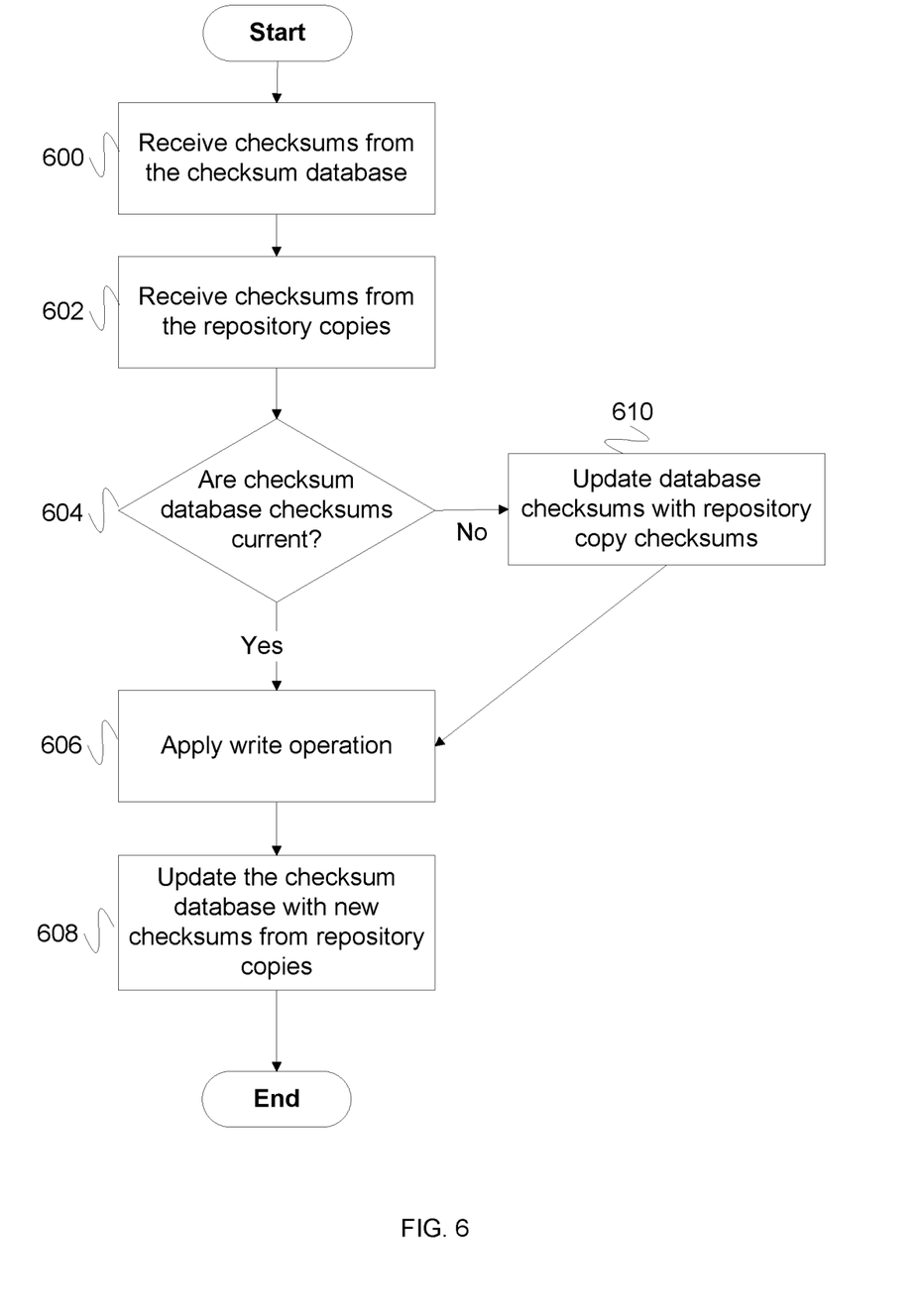
FIG. 6 is a flow diagram illustrating an embodiment of a process for implementing a repository modification.

FIG. 6 is a flow diagram illustrating an embodiment of a process for implementing a repository modification. In some embodiments, the process of FIG. 6 is implemented by repository system 200 of FIG. 2. In the example shown, in 600, a set of checksums is received from a checksum database. For example, each checksum from the checksum database represents the state of a repository copy from a previous moment in time; the set of checksums is received to establish whether the repositories are synchronized. In some embodiments, the set of checksums includes one checksum for each copy in a repository system. In 602, a set of checksums is received from repository copies. In some embodiments, the set of checksums includes one checksum for each copy in a repository system. In 604, it is determined whether the checksums of the checksum database are current. For example, it is determined whether the checksums received from the checksum database do not match the corresponding checksum received from the repository copy. In the event that the checksums of database checksum are current, control passes to 606. In the event that the checksum database checksums are not current, in 610, database checksums are updated with repository copy checksums. For example, the repository system checksums are stored in the checksum database before control passes to 606. In 606, the write operation is applied. For example, the write operation is applied to each repository copy. In 608, the checksum database is updated with new checksums from repository copies. For example, new checksums are generated for each repository copy after the write operation is executed, and the checksum database is updated with the new checksums.

Figure 7:
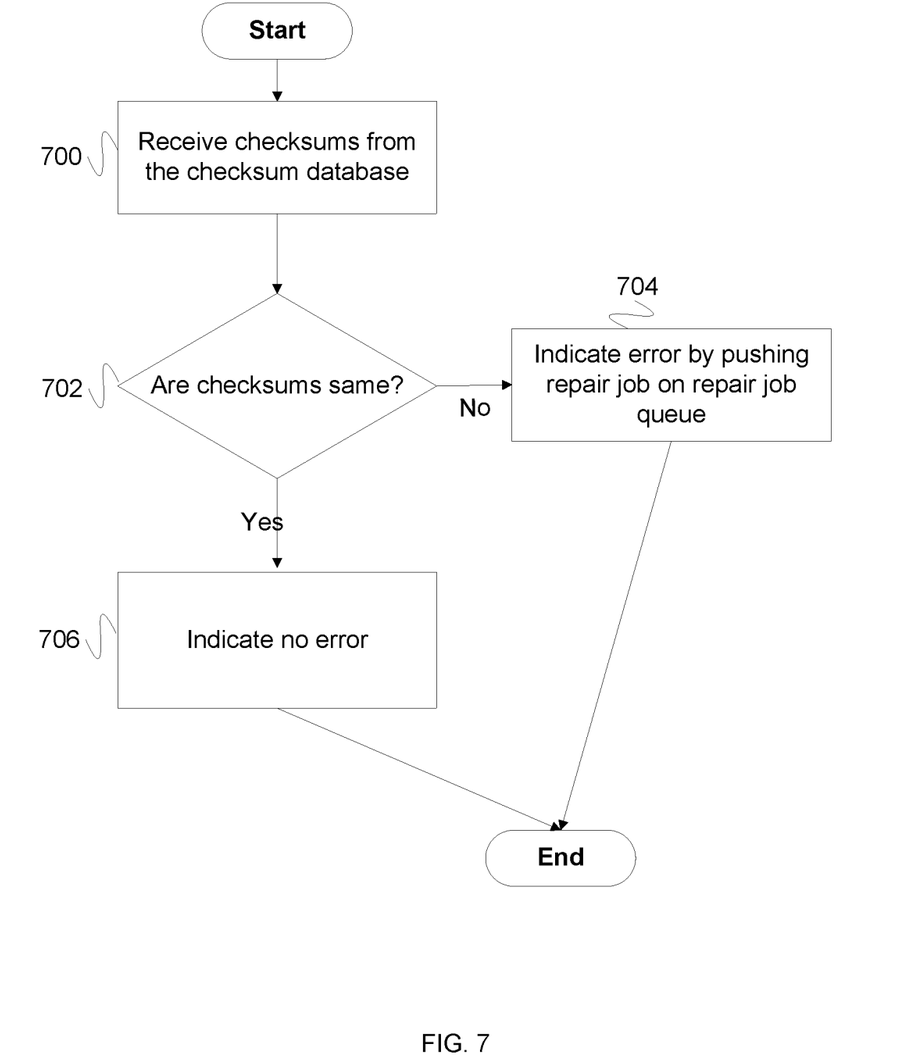
FIG. 7 is a flow diagram illustrating an embodiment of a process for verifying checksums.

FIG. 7 is a flow diagram illustrating an embodiment of a process for verifying checksums. In some embodiments, the process of FIG. 7 is implemented by error detection manager 304 and repair manager 312 of FIG. 3. In the example shown, in 700, a set of checksums is received from a checksum database. For example, each checksum database checksum represents the state of a repository copy as of the completion of the most recent repository modification operation The set of checksums is received to establish whether the individual checksums share the same value. In some embodiments, the set of checksums includes one checksum for each node in a repository system. In 702, it is determined whether each checksum in the set of checksums is the same. In the event that each checksum in the set of checksums is the same, a process return value of no error is generated, and the process ends. In the event that each checksum in the set of checksums is not the same, control passes to 704. In 704, an error is indicated by pushing a repair job onto the repair job queue, and the process ends. In some embodiments, the repair job directly correlates to the error found (e.g., in the event that all but one repository node checksum have the same value, a copy repair job is queued to copy the contents an in agreement node to the one node in disagreement).

Figure 8:
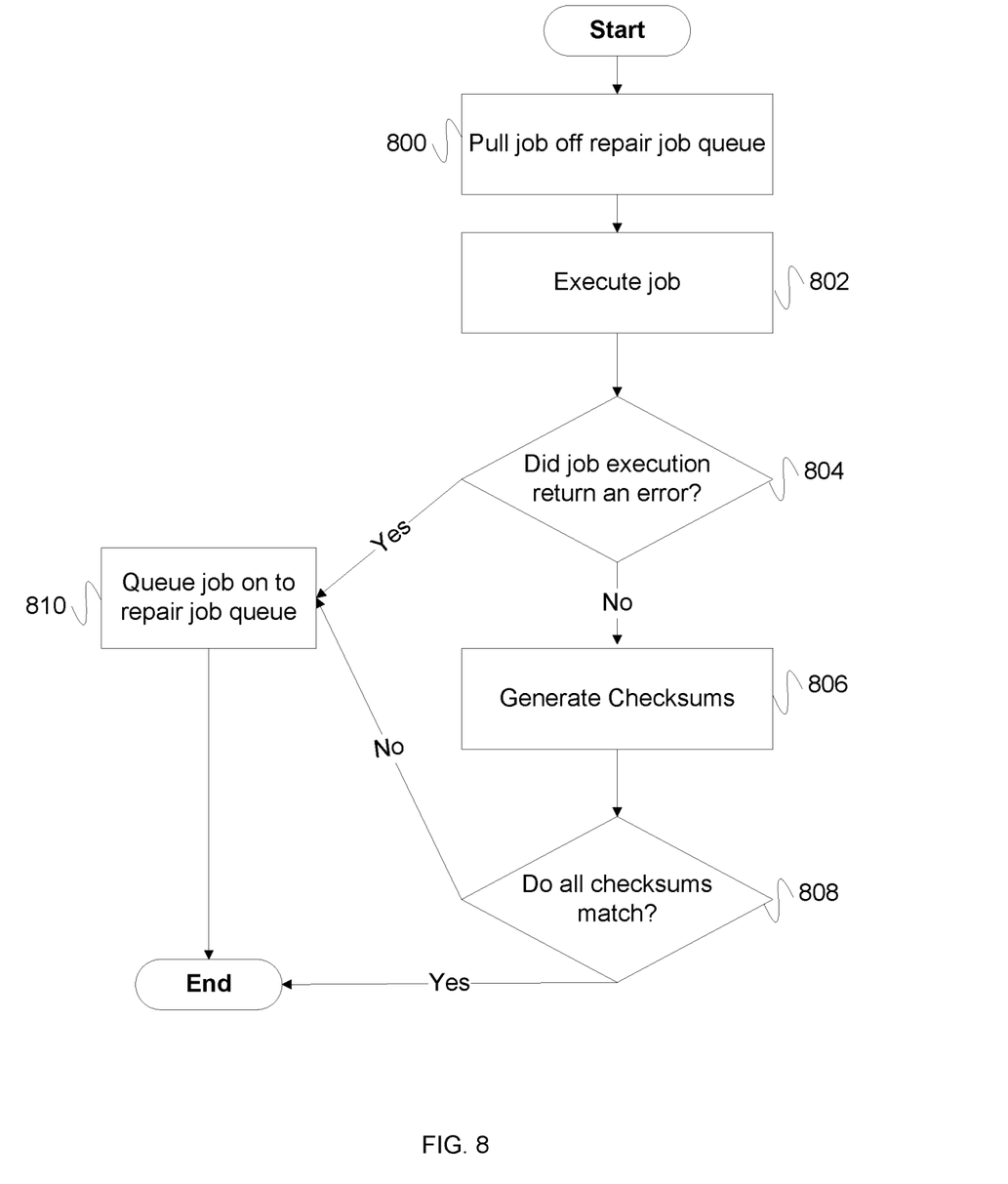
FIG. 8 is a flow diagram illustrating an embodiment of a process for executing a repair job.

FIG. 8 is a flow diagram illustrating an embodiment of a process for executing a repair job. In some embodiments, the process of FIG. 8 is executed by repair manager 312 of FIG. 3. In the example shown, in 800, a job is pulled off a repair job queue. For example, in the event that a repair job exists on the repair job queue, the repair job is removed from the repair job queue. In 802, the job is executed. For example, the commands in the repair job are executed by the repair manager. In 804, it is determined whether the job execution returns an error. For example, it is determined whether the execution of any commands in the repair job returned an error. In the event that the job execution returns an error, in 810 the job is queued on to repair job queue. For example, the repair job is put back on the repair job queue for later execution. In the event that the job execution returns no error, in 806, checksums are generated. For example, for each repository node a checksum is generated that uniquely characterizes the state of the repository. In 808, it is determined whether all the checksums match. In the event that all the checksums do not match, control passes to 810. In the event that all the checksums match, the process ends. For example, the repair job is considered successful. In some embodiments, in the event that a repair job fails too many times, the repair job is not put back on the job queue, and it is indicated that the job has failed too many times. In some embodiments, the indication that the job has failed too many times is used to flag an administrator to review the job.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for maintaining a repository replication system, comprising:
    an interface to:
        receive a request to modify a repository, wherein the repository comprises repository copies; and
    a processor to:
        determine whether modifying the repository resulted in an indication of an error, wherein the indication of the error is based at least in part on a plurality of checksums, wherein a checksum of the plurality of checksums is associated with a repository copy of the repository copies; and
        in response to a determination that modifying the repository resulted in the indication of the error:
            queue a repair request in a repair queue to repair the error;
            cause a repair process corresponding to the repair request to be executed to repair the error associated with the repair request;
            cause the repair request to be removed from the repair queue, wherein removing the repair request from the repair queue and executing the repair process occur asynchronously to queuing the repair request;
            determine whether a majority of the plurality of checksums agree in the event that modifying the repository resulted in the indication of the error; and
            indicate that modifying the repository was successful in the event that at least the majority of the checksums agree.

2. A system as in claim 1, wherein the repository comprises a code version control system.

3. A system as in claim 1, wherein the processor is further to modify the repository in response to the request to modify the repository.

4. A system as in claim 3, wherein modifying comprises receiving database checksums from a checksum database.

5. A system as in claim 4, wherein modifying comprises receiving repository checksums from the repository copies.

6. A system as in claim 5, wherein determining whether the database checksums are current with the repository checksums.

7. A system as in claim 6, wherein the database checksums are updated using the repository checksums in the event that the database checksums are not current.

8. A system as in claim 7, wherein the database checksums are updated using new repository checksums.

9. A system as in claim 8, wherein determining whether modifying the repository resulted in the indication of the error comprises receiving the database checksums.

10. A system as in claim 9, wherein determining whether modifying the repository resulted in the indication of the error comprises determining whether the database checksums differ.

11. A system as in claim 10, wherein in the event that the database checksums differ, an error is indicated.

12. A system as in claim 3, wherein modifying comprises applying a write operation.

13. A system as in claim 1, in the event that the majority of the plurality of checksums do not agree, indicate that modifying the repository was not successful.

14. A system as in claim 1, wherein removing the repair request from the repair queue and executing the repair process are performed asynchronously to queuing the repair request by a repair manager of the system that is distinct from the interface of the system, and wherein executing the repair process occurs while the interface receives an additional request to modify the repository and while the interface determines whether modifying the repository according to the additional request to modify the repository resulted in an indication of another error based at least in part on another plurality of checksums.

15. A method for maintaining a repository replication system, comprising:
    receiving a request to modify a repository, wherein the repository comprises repository copies;
    determining, using a processor, whether modifying the repository resulted in an indication of an error, wherein the indication of the error is based at least in part on a plurality of checksums, wherein a checksum of the plurality of checksums is associated with a repository copy of the repository copies; and
    in response to a determination that modifying the repository resulted in the indication of the error:
        queuing a repair request in a repair queue to repair the error;

causing a repair process corresponding to the repair request to be executed to repair the error associated with the repair request;

causing the repair request to be removed from the repair queue, wherein removing the repair request from the repair queue and executing the repair process occur asynchronously to queuing the repair request;

determining whether a majority of the plurality of checksums agree in the event that modifying the repository resulted in the indication of the error; and indicating that modifying the repository was successful in the event that at least the majority of checksums agree.

16. A computer program product for maintaining a repository replication system, the computer program product being embodied in a computer readable storage medium that excludes carrier waves or signals and comprising computer instructions for:

receiving a request to modify a repository, wherein the repository comprises repository copies;

determining, using a processor, whether modifying the repository resulted in an indication of an error, wherein the indication of the error is based at least in part on a plurality of checksums, wherein a checksum of the plurality of checksums is associated with a repository copy of the repository copies; and in response to a determination that modifying the repository resulted in the indication of the error:

queuing a repair request in a repair queue to repair the error;

causing a repair process corresponding to the repair request to be executed to repair the error associated with the repair request;

causing the repair request to be removed from the repair queue, wherein removing the repair request from the repair queue and executing the repair process occur asynchronously to queuing the repair request;

determining whether a majority of the plurality of checksums agree in the event that modifying the repository resulted in the indication of the error; and indicating that modifying the repository was successful in the event that at least the majority of checksums agree.

* * * * *